April 10, 1951   F. J. WEST ET AL   2,548,086
GAS PRODUCER INCLUDING ROTATABLE ASH BREAKING GRATE MEANS
Filed June 24, 1947   3 Sheets-Sheet 2
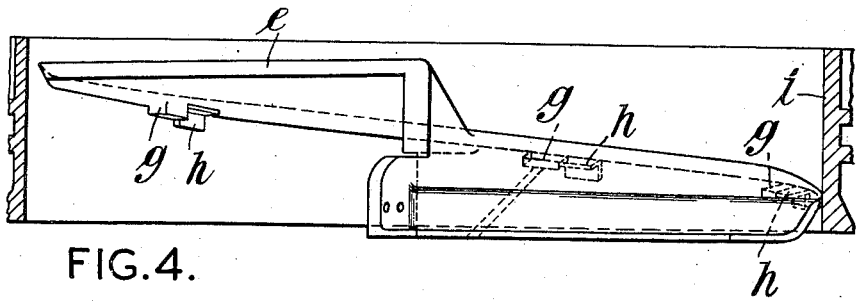
FIG. 4.
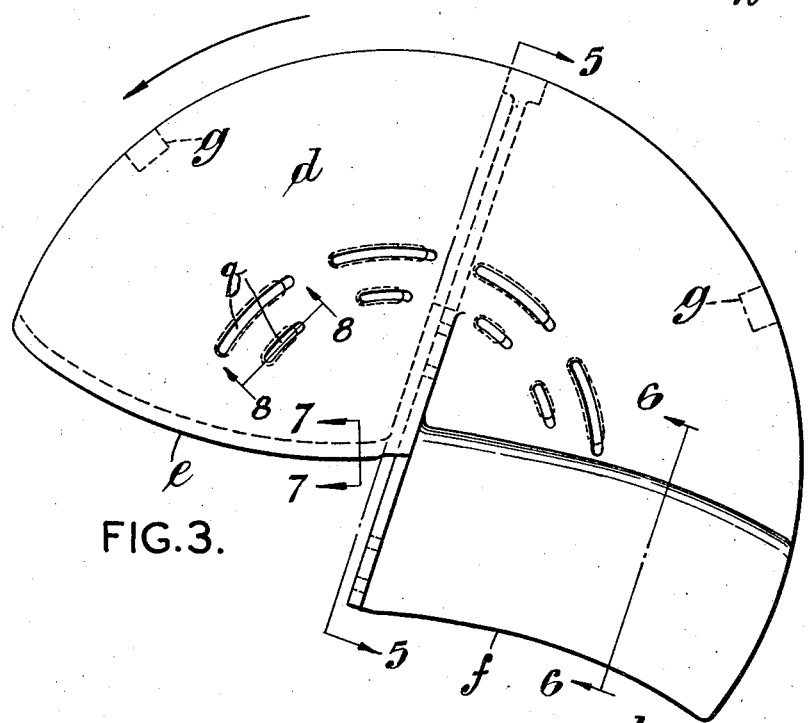
FIG. 3.
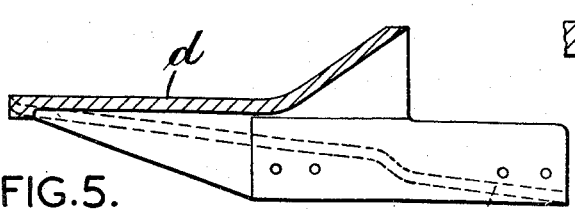
FIG. 5.
FIG. 8.
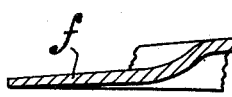
FIG. 6.
FIG. 7.
Inventors
F. J. West
E. West
By Glascock Downing Tickle Attys April 10, 1951     F. J. WEST ET AL     2,548,086
GAS PRODUCER INCLUDING ROTATABLE ASH BREAKING GRATE MEANS
Filed June 24, 1947     3 Sheets-Sheet 3
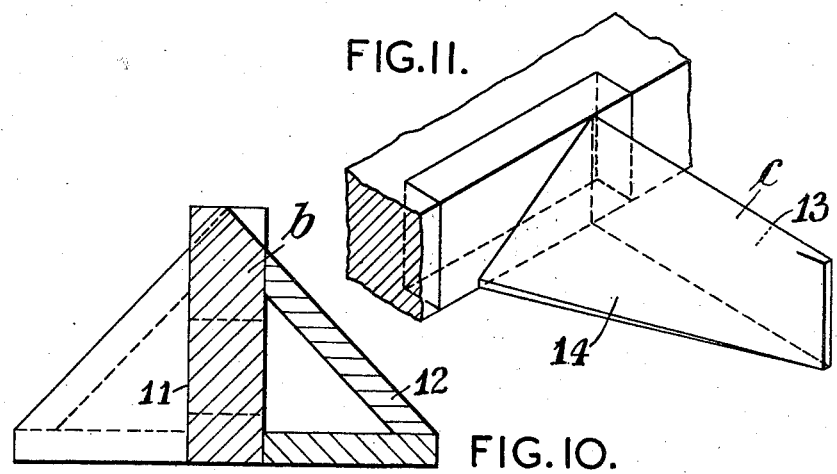
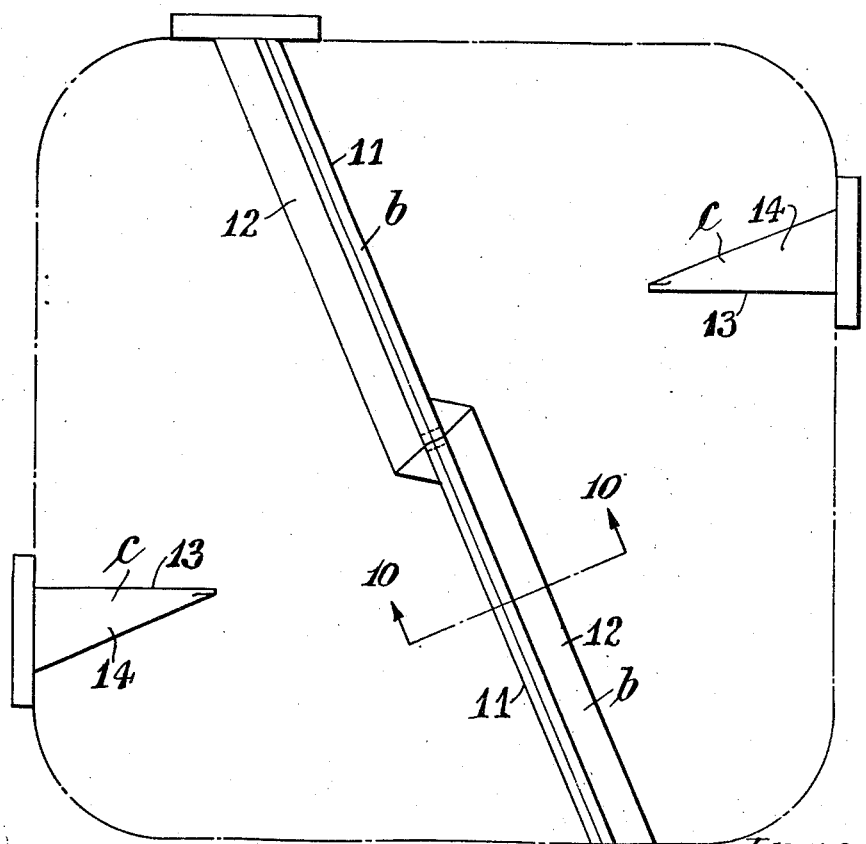
Inventors
F. J. West
E. West Patented Apr. 10, 1951

2,548,086

UNITED STATES PATENT OFFICE 2,548,086

GAS PRODUCER, INCLUDING ROTATABLE ASH BREAKING GRATE MEANS

Frederick Joseph West and Ernest West, Manchester, England, assignors to West's Gas Improvement Company Limited, Manchester, England, a British company Application June 24, 1947, Serial No. 756,740
In Great Britain May 27, 1946

Section 1, Public Law 690, August 8, 1946
Patent expires May 27, 1966

4 Claims. (Cl. 110—36)

The object of the invention is to improve the construction of the producer grate in order to effect a greater breaking up of the ash on the grate so that it can be more readily removed by the grate structure.

The invention consists in a gas producer having its grate in the form of a plurality of perforated portions of helices or spirals with their leading edges substantially radially disposed at the top surface of the grate and spaced equidistantly apart, the rear edge of each portion extending below and behind the leading edge of the next succeeding portion, the said helical portions being supported in and driven by a cylindrical casing which is revolved by suitable means, supported by rollers and centralized by rollers, there being a water sealed joint between the top of the casing and the bottom of the producer.

The invention further comprises making the leading edge of each helical portion of the grate of curved form and as a knife edge.

The invention further comprises providing fixed parts extending into and/or across the base of the producer above the grate to assist in breaking up the ash on the grate as the latter revolves.

The invention further comprises providing a part extending across the base of the producer chamber which presents a flat vertical side to the ash being carried round by the grate and has a sloping rear side.

The invention further comprises the provision of arms extending into the producer chamber base immediately above the revolving grate, such arms presenting a flat vertical face to the ash being carried round by the grate and having a sloping rear side.

Referring to the accompanying explanatory drawings:

Figure 3 is a plan view of one sector of the revolving grate.

Figure 4 is an elevation of one sector of the revolving grate with the casing which revolves the grate shown in section.

Figure 5 is a sectional view on the line 5—5 of Figure 3.

Figure 6 is a sectional view on the line 6—6 of Figure 3.

Figure 7 is a sectional view on the line 7—7 of Figure 3.

Figure 8 is a sectional view on the line 8—8 of Figure 3.

Figure 9 is a plan view of the base of the coke chamber of the producer shown in Figure 1.

Figure 10 is a sectional elevation on the line 10—10 of Figure 9 drawn to a larger scale.

Figure 11 is a detail view of one of the inwardly projecting arms shown in Figure 9.

Figure 1:
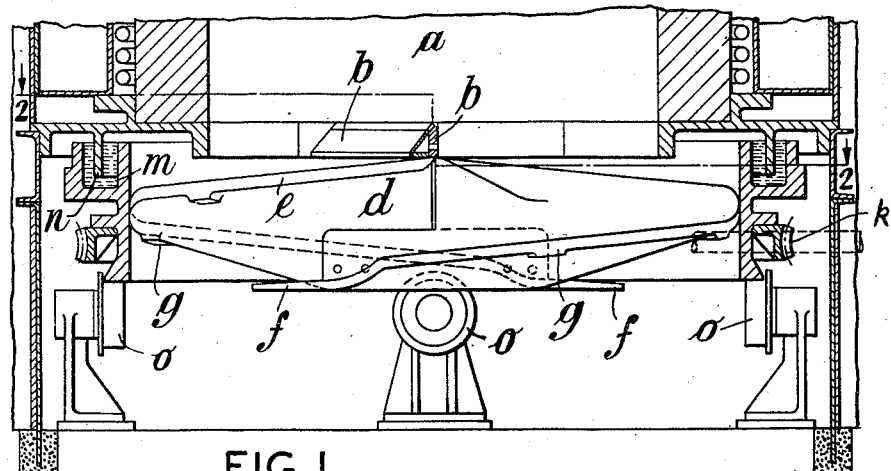
Figure 1 is a sectional elevation on the line 1—1 of Figure 2, and Figure 2 a sectional plan view on the line 2—2 of Figure 1 showing the grate of a gas producer constructed in accordance with this invention.

Across the base of the coke chamber $a$ of the gas producer is disposed the part $b$ (see Figures 9 and 10) which presents a flat vertical face 11 at one side to restrain the coke which rests upon and tends to be carried round by the revolving grate beneath from partaking of its rotary movement. In this way ash upon the grate is broken up as the grate revolves. The rear side 12 of the part $b$ considered from the point of view of the direction of rotation of the grate is inclined or slopes as shown in Figures 1, 9 and 10, to facilitate the descent of any ash which passes over the part $b$.

There are also two arms $c$ which project into the coke chamber between the ends of the part $b$ each arm having a flat vertical front side 13 and a sloping rear side 14 as shown in Figure 11.

The grate proper comprises two similar parts $d$, each being a portion of a helix or spiral around a vertical axis, the leading edge $e$ of each portion being either curved as shown or straight and constituting a knife edge (see Figure 7) and the rear edge $f$ of each portion extending below and behind the leading edge of the other portion.

Each portion $d$ of the grate has lugs $g$ on its underside at the peripheral edge which are engaged by brackets $h$ on the revolving cylinder $i$ which support the grate portions so that the grate revolves with the cylinder. The latter is driven by the worm $j$ and worm wheel $k$ and at its upper end has a water trough $m$ therein into which dips a ring $n$ secured to the framework of the producer so as to make an air tight joint between the cylinder $i$ and the base of the coke chamber $a$ above the grate. The cylinder $i$ rides upon rollers $o$ and is centralized by rollers $p$ riding upon its periphery.

Figure 2:
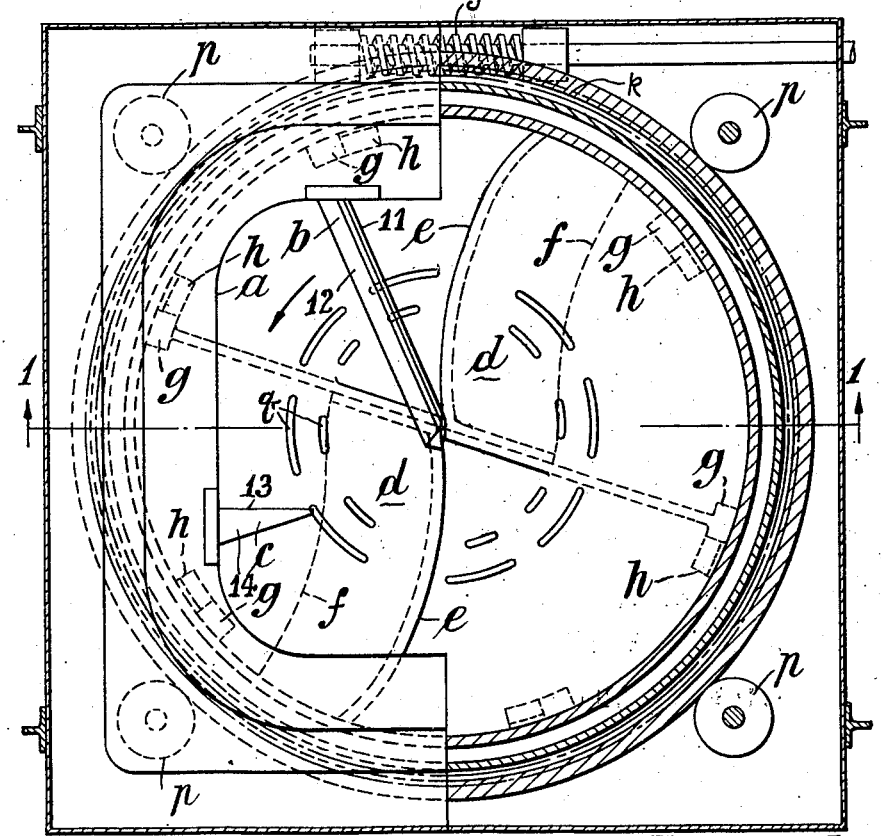

Each helical portion $d$ is perforated and the elongated slots $q$ therein have angular walls at front and back in the direction of rotation as shown in Figure 8 to tend to lift the material on the grate when it enters a slot. The slots are disposed in circles around the axis of the grate as shown in Figures 2 and 3.

What we claim is:

1. A gas producer comprising a coke chamber, a grate having a casing and formed by a number of perforated helical parts mounted in the casing, each helical part having a leading edge of curved shape and substantially radially disposed at the top of the grate and a trailing edge which extends behind and below the leading edge of the next succeeding helical part, rollers for supporting and centralizing the grate casing, means forming a water seal between the casing and the coke chamber, means for rotating the grate and means in the coke chamber immediately above the grate for preventing the rotation of ash above the grate so that the leading edges on the grate cut through the ash.

2. A gas producer comprising a coke chamber, a grate having a casing and formed by a number of perforated helical parts, each helical part having a leading edge of curved shape and substantially radially disposed at the top of the grate and a trailing edge which extends behind and below the leading edge of the next succeeding helical part, rollers for supporting and centralizing the grate casing, means forming a water seal between the casing and the coke chamber, means for rotating the grate, and parts fixed to the walls of the coke chamber and extending into the base of the chamber immediately above the grate to prevent the rotation of ash above the grate so that the leading edges thereon cut through the ash.

3. A gas producer as claimed in claim 2, in which the parts fixed to the walls of the coke chamber include arms each of which presenting a flat vertical face to any ash being carried round by the grate and having a sloping opposite side.

4. A gas producer as claimed in claim 2, in which the parts fixed to the walls of the coke chamber include a part extending diametrically across the base of the coke chamber, such part presenting flat vertical faces to any ash being carried round by the grate and having sloping sides opposite the faces.

FREDERICK JOSEPH WEST.
ERNEST WEST.

REFERENCES CITED

The following references are of record in the file of this patent:

UNITED STATES PATENTS

| Number | Name | Date |
|---|---|---|
| 337,849 | McFarland | Mar. 16, 1886 |
| 386,665 | Solvay | July 24, 1888 |
| 666,517 | Groll | Jan. 22, 1901 |
| 856,137 | DeGalocsy et al. | June 4, 1907 |
| 1,645,671 | Trefois | Oct. 18, 1927 |
| 1,709,107 | Andrews | Apr. 16, 1929 |
| 2,289,347 | Daae | July 14, 1942 |